Patented May 16, 1950

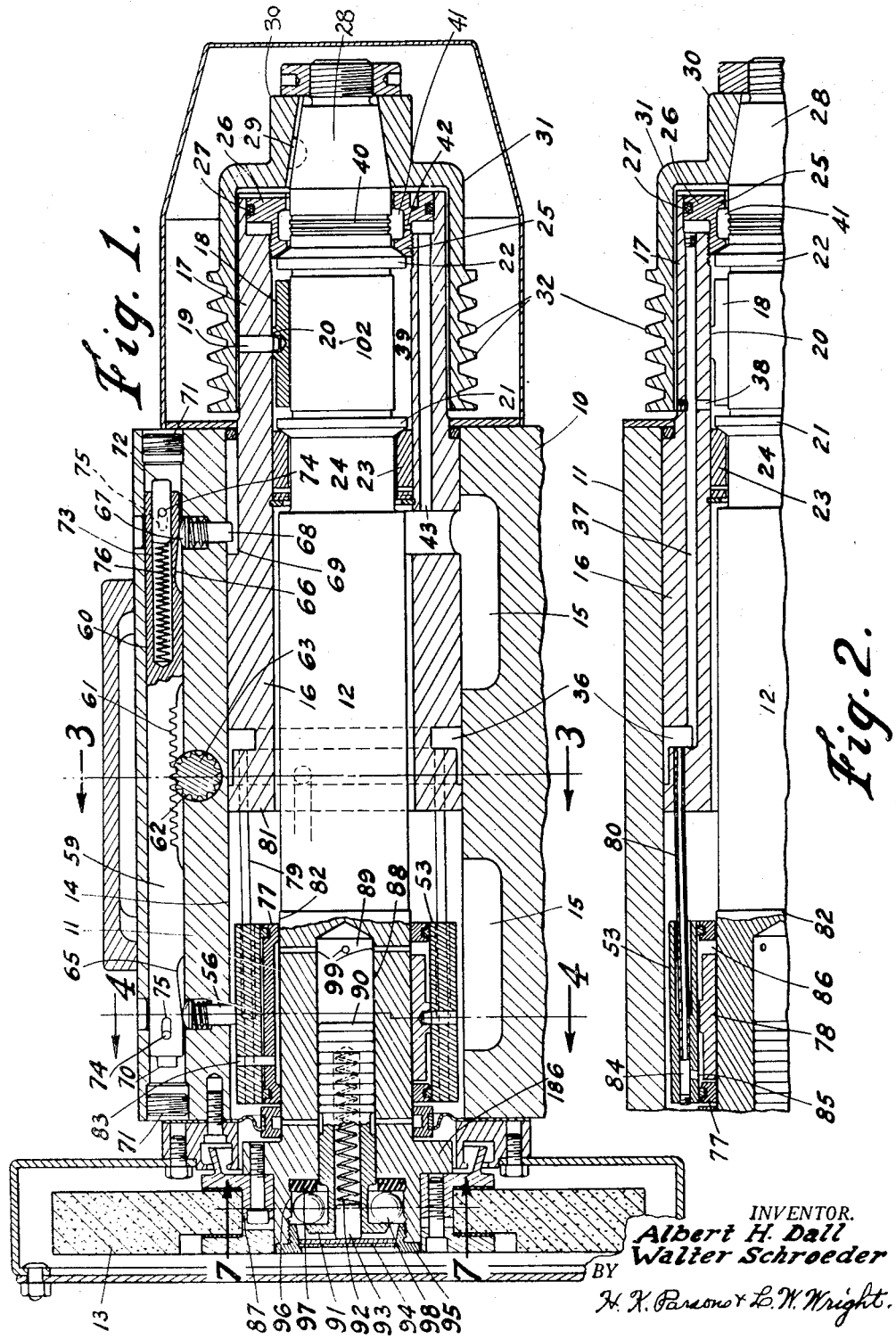

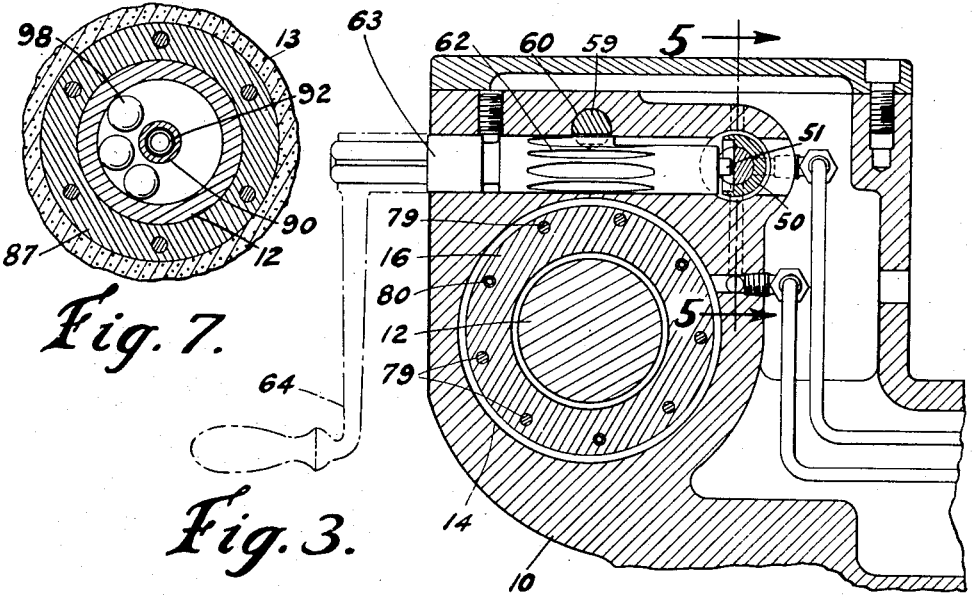

2,507,558

UNITED STATES PATENT OFFICE 2,507,558

DYNAMIC BALANCING MECHANISM

Albert H. Dall and Walter Schroeder, Cincinnati, Ohio, assignors to The Cincinnati Milling Machine Co., Cincinnati, Ohio, a corporation of Ohio Application April 12, 1947, Serial No. 741,076

17 Claims. (Cl. 74—574)

This invention relates to improvements in dynamic balancing mechanisms and has particular reference to a mechanism of this character especially adapted for use in connection with machine tool spindles.

One of the principal objects of the present invention is the provision of a compact, self-contained balancing mechanism and controls therefor which may be readily embodied in conventional machine tool structures without appreciable alteration in the basic elements thereof.

A further object of the present invention is the provision of a self-contained structure and support therefor of such character that the parts may be readily reversely assembled for selective supporting of the balancing mechanism and associate parts at either side of the supporting machine.

A further object of the present invention is the provision of a balancing mechanism embodying improved unitary resilient means for supporting of the end of a spindle to be balanced which are built in as an integral part of the machine tool spindle bearing structure and unitarily removable from the machine.

Another object of the present invention is the provision of a simplified unitary control mechanism particularly applicable to built-in dynamic balancing mechanisms in which the clamping or release of the unit to be balanced, the pressure within the journals for said unit, and the release or locking of the automatic balancing elements may be individually or simultaneously effected by a single control mechanism.

A further object of the present invention is the provision of a novel and improved form of drive mechanism for minimizing adverse drive reactions during performance of a balancing operation.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 1 represents a fragmentary vertical sectional view of a grinding machine and spindle therefor constructed in accordance with and embodying the principles of this invention.

Figure 2 presents a fragmentary sectional view in a different radial plane as indicated by the line 2—2 in Figure 4.

Figure 3 represents a transverse sectional view as on line 3—3 of Figure 1.

Figure 4 represents a similar sectional view on the line 4—4 of said figure.

Figure 5 represents a vertical sectional view through the hydraulic control valve mechanism as on line 5—5 of Figure 3.

Figure 6 illustrates diagrammatically the hydraulic control circuit, and

Figure 7 presents a fragmentary vertical sectional view as on the line 7—7 of Figure 1.

In the drawings in which similar characters of reference denote corresponding parts throughout the several views, the numeral 10 designates the frame portion of a grinding machine having the substantially cylindrical spindle housing element 11 to receive the grinding wheel spindle 12 bearing on one end the grinding wheel 13.

It will be noted that the housing 11 has a uniform diameter bore 14 subtended as at 15 by oil drains.

Adapted to be mounted within this bore is a main supporting sleeve 16 of diameter to tightly fit within the bore 14 in which it is removably locked by suitable securing means (not shown). The sleeve 16, as shown, has a reduced diameter outwardly extending portion 17 interiorly supporting the rocking bearing shoes 18 of conventional construction retained in position as by pins 19 and having the pivot spots 20 engaging the interior of the sleeve and permitting of universal rocking of the shoes with respect to the sleeve. Adjacent the shoes the spindle is formed or provided with the end thrust frusto-spherical discs 21 and 22. Disc 21 contacts the split collars 23 which are mounted within the sleeve 16 and circumscribe the reduced neck 24 of the spindle. Disc 22 suitably engages the threaded plug 25 screwed into the outer end of the sleeve 16 and provided with a flanged head 26 bearing sealing washer 27. The spindle 12 has a taper cone portion 28 projecting through the member 26 and having keyed thereto as at 29 hub 30 of the reversely extending pulley flange 31 terminating in the series of ribs 32 providing intermediate multiple drive belt receiving grooves which are disposed in balanced relation circumscribing the pivot areas of the freely moving bearing shoes 18. It will be noted that the interengaging faces of the parts 21, 22 with the elements 23, 25 are such that the slight desired angular oscillation of the shaft 12 may be effected without disturbing the positioning effect of the elements which serve to prevent endwise movement of the spindle and firmly maintain same in prescribed axial position within the grinding machine.

As is well understood in the art, it is necessary that rocker shoe bearings of the type here illustrated be kept continuously supplied with oil under pressure. In Figure 6 there has been diagrammatically illustrated as suitably contained within the machine to which the present invention is applied a suitable oil source or reservoir 33 from which the oil is circulated under pressure by pump 34 through line 35 to the circumscribing oil groove 36 in sleeve 16. As indicated in Figure 2, sleeve 16 is formed with the drilled passage 37 communicating through 38 with the space 39 surrounding the rocking shoes and substantially enclosed by the interfitting of the members 21, 22 and their associate parts.

The spindle itself is provided with the oil slinger ribs 40 within the chamber 41 of member 26 which is provided with the drain passage 42 communicating through passage 43 in sleeve 16 with the drain recess 15 of the bed or housing 10. As shown, a suitable return drain 44 conducts the oil from the space 15 to the reservoir.

To provide normal operating pressure within the hydraulic system just described, there is provided the reservoir return line 45 branching off from the pump pressure line before it reaches the bearing area, this conduit extending by way of valve chambers 46 and 47 to reservoir. Controlling the flow through chamber 47 is a low pressure relief valve 48 actuable as by spring 49 for continuously maintaining a low pressure such, for example, as a five-pound pressure within the hydraulic system for insuring supply of oil to the bearings or such other points as may be fed by pump 34. It will be noted that valve 50 and chamber 46 are serially arranged with respect to the valve 48, valve 50 being normally maintained in open position as by the control pin 51 so that it has no effect on the normal operating pressures. When released, however, its spring 52 is much heavier and may form, for example, a pressure of 75 to 80 pounds in the line 35—45, reacting upon the various pump fed elements.

To support the spindle in the housing at the opposite end from the bearing shoes 18 there has been provided a second journal member including an outer sleeve or housing member 53 which is of less diameter than the diameter of the receiving bore 14 as will be evident by reference to Figures 1 and 4. This sleeve is, however, provided with the radially extending lugs or seat portions as at 54 and 55 adapted to abut the interior of the bore for stabilizing the member 53 in substantially axially centralized position as respects the geometrical bore thereof, a locking pin such as 56 serving to engage the upper face of member 53 to retain same in tight engagement with the interior of the bore during ordinary operating conditions.

By reference to Figures 1 and 4 it will be noted that the clamp pin 56 is slidably mounted in the housing 11 and outwardly urged into releasing position as by spring 57. It is further provided with the rounded head 58 projectable into engagement with the lock bar 59. This bar 59 is slidable in passage 60 of the housing 11, being formed with a rack portion 61 intermeshing with pinion teeth 62 on rock shaft 63 which is oscillatable as by handle 64 to effect the desired reciprocation of member 59. This member, it will be noted, is provided with the pair of tapered recesses 65 and 66 oppositely extending and respectively engaging head 58 of pin 56 and head 67 of pin 68. In the construction as shown, when member 59 is in centralized position with handle 64 depressed, as shown in Figure 3, the cam face of recess 65 forces pin 56 downward to clamp the sleeve 53 in the position shown in Figures 1 and 4. At the same time pin 68 is pressed inwardly and fits into the slot 69 of sleeve 16.

When it is desired to relieve this clamping effect, handle 64 is rotated in a counterclockwise direction as respects the position of parts shown in Figure 1, moving bar 59 toward the left and releasing clamping pressure on pin 56. This movement is continued until abutment 70 contacts adjustable end plug 71 forming a closure for the slide bar receiving passage 60.

Abutment 70, like abutment 72 shown in the right hand portion of Figure 1, is slidable within a socket such as 73 in the end of member 59, being held against outward movement as by pin 74 slidably received in slot 75, and is outwardly urged by spring 76. It will thus be seen that upon movement of rack bar 59 to the left, member 70, and on corresponding movement thereof to the right member 72, will contact with the respective end stop plugs 71 and be restrained with its respective pin 56 or 68 in an unclamped position. Additional movement of handle 64 in a counterclockwise direction will, however, serve to effect an amplified movement of 59 to the extent permitted by the yielding of abutment 70 or 72. This entire movement is within the limit between clamping position and high point of the control notch or recess 65. The continued movement, however, is against the opposing pressure of spring 76 so that upon release of the handle the spring will expand with member 70 against plug 71 to effect a limited movement of member 59 to the right without, however, effecting a clamping action upon the sleeve 53.

It will be noted particularly by reference to Figures 1 and 4 that the sleeve element 53 serves as a support for the slotted bushing 77 and the rocking shoes 78 which constitute the journal bearing for the contained spindle 12.

While the member 53 is a separate structure entity from the journal sleeve 16 it is connected thereto by two sets of normally deflected resilient elements comprising respectively a plurality of spring rods or bars 79 and intermediate spring tubes 80 which are disposed as a cage circumscribing the spindle 12. The several bars and rods have their right hand end firmly fitting within and secured to the terminal portion 81 of sleeve 16 and their left hand portions extending into sockets formed in the member 53 where they are likewise firmly secured. It will be noted by reference to Figure 1 that with the parts in clamped position the members, such as 79, have a slight downward deflection so that when the pin 56 is released they will tend to spring upwardly, raising the abutment portions 54 and 55 of sleeve 53 into a position of clearance with respect to the interior of the bore 14. By reference to Figures 1 and 2 it will be noted that the bushing 77 is mounted in close interfitting engagement with the slightly enlarged journal portion 82 of the spindle and is pinned to the sleeve 53 as at 83 to prevent rotation relative thereto, thus providing a substantially oil tight fit between the journal proper, the contained spindle and the circumscribing bearing sleeve. The tubular members 80, as shown in Figures 2, 3, and 4, communicate at one end with the oil pressure groove

86 in the sleeve 16 and afford communication therefrom by way of socket 84 and passage 85 to the journal space 86 which includes the several rocking shoes 78. Accordingly, whatever pressure exists in conduit 35 will be built up in and supplied to the space 86.

In this connection it will be noted that the spindle 12 has an enlarged flange or headed portion 186 for the mount 87 carrying the grinding wheel 13 and is further formed with the socket 88 providing a piston chamber 89 for the release piston 90 of clamp 91. This clamp is urged into inward or clamping position as by spring 92 which reacts at one end interiorly against the piston 90 and at the other against the abutment pin 93 retained in spring compressing position as by cover plate 94 secured in position by tightening of end plug 95. Formed in the spindle head 186 in circumscribing relation to the piston plunger 90 is a recess 96 inwardly faced as by a resilient disc or washer 97 and providing a recessway for the balls or like shiftable weight devices 98, the parts being so arranged and disposed that when piston 90 is pushed outwardly against the urge of spring 92 the weights 98 will be released and rendered free to assume suitable balancing position. It will be noted there have been provided the passages 99 affording communication between the space 86 and chamber 89 so that whatever pressure exists within the bearing space as enclosed by sleeve 53 will also exist in the interior chamber 89. The force of spring 92, however, is such that the normal operating bearing pressure of the hydraulic medium within the cylinder will be insufficient to effect any releasing movement of the member 91.

By reference to Figures 3 and 5 it will be noted that the spindle 63 carries the eccentrically positioned pin 51 cooperating with the abutment shoulder 100 on the valve 50. As indicated by the angularly related dash lines in Figure 5, rotation of member 63 and associate pin 51 in one direction or another to the extent limited by the abutments 70 and 72 does not release the valve member 50 to an extent such that spring 52 is effective to increase the pressure in return conduit 45. However, when additional rotary movement is imparted to handle 64 against the resistance of spring 76 the valve 50 is released and becomes effective automatically to build up or increase the pressure in conduit 45 and thus the pressure reaction through 35 by way of the front sleeve bearing into the chamber 89, causing the outward movement of plunger 90 and release of the balancing weights 98.

It will be understood that the principle employed in the present invention is the phenomenon that when a body such as spindle 12 is rotated at above its critical speed, if it is free to pivot at one point and is yieldingly restrained at a remote point, in the event that the rotating structure as an entirety is out of balance it will tend to establish an axis of rotation about its axis of mass as distinguished from its geometrical axis. Consequently, if there be associated with the member freely movable weight devices which can shift in a path preferably concentric with the geometrical axis of rotation of the part, these members will automatically take up positions correcting the out of balance effect and reestablishing rotation of the spindle or like member about its geometric axis. Under these conditions clamping of the movable members in such automatically determined position will then establish a self-contained automatically balanced condition and the structure will be free from vibration under operating conditions. The principle here employed in connection with different mechanism for attaining the results in question has been set forth in Patent 2,142,021, the present invention therefor relating to commercially important improvements over the construction there shown.

In connection with the foregoing, attention is particularly invited to the fact that the spindle housing of the machine is formed with a symmetrical uniform diameter bore for reception of the spindle mounting, and that all parts of the self-contained unit are of such diameter that they may be readily, axially introduced into and secured in position in said bore. Likewise, they can be introduced from either end depending on whether it is desired to have the grinding wheel at the right or at the left of the housing as viewed in Figure 1. In both instances the sleeve 16 will properly interfit with the housing and position the parts while the supplemental resiliently supported auxiliary bearing unit sleeve 53 may be positioned at either the right or the left, suitable pins 56 and 68 being provided so that one or the other may be utilized for normally clamping the auxiliary sleeve in position dependent on the right or left hand mounting of the parts.

It will further be noted that the member 59, associated parts, and control valve are also all so mounted as to be capable of reverse or opposite actuation for first unclamping the contained bearing sleeve member 53 so that same may spring freely within the bore and for then subsequently actuating the piston 90 to unclamp the balancing weights. It is to be particularly noted that in either direction of operation the on and off action of the increased or clamp relieving pressure permitting of adjustment of the weights can be effected by extreme movement of the handle 64 while it automatically returns to the intermediate unclamped position. In this unclamped position the parts are free to rotate with normal pressure within the rocker shoe bearings, whereupon any tendency of the parts to vibrate if complete balancing has not been attained, are readable as upon the indicator 101 mounted in the front of the housing 10, while centralizing position of the lever insures reclamping of the potentially resilient mounted bearing unit 53. Particular attention is also invited to the reversely extending member 31 carrying the belt guide ribs 32 in centralized position with respect to the potential point of pivotance of the axis of the spindle 12 when the same is unclamped. This permits of proper driving of the spindle at a speed equal to or greater than the critical speed necessary for automatic balancing and at the same time so distributes the driving belt urge that there is no distorting tension or strain interfering with proper automatic positioning of the axis.

In connection with previous attempts at accurate dynamic balancing employing self-adjusting movable weights, certain difficulties have been experienced when but two of such weights are employed. These have been due in part to frictional or other resistance to free vibration or position determination of the rotating members to be balanced and in part due to the fact that under some conditions one of the balancing members will take up a position substantially on the heavy side where it will be maintained by equal and oppositely reacting forces, tending to augment rather than compensate for the initial out of balance condition, a situation arising in connection with certain phase angle relationships.

We have discovered that this situation is completely overcome by the employment of three or more of the automatically adjusting weight members 98 and that it is preferably an unequal number of such balancing members to be employed. In such an arrangement as this imposes, however, ordinary clamping means are inadequate to maintain each individual member 98 in its automatically adjusted position and prevent the clamping pressure being taken up by certain weight devices only, allowing the others an undesirable freedom for independent shifting movement. We have discovered that this difficulty may be overcome most advantageously if the member 97 is formed from natural or synthetic rubber or other suitable resilient material. When so formed, the clamping pressure will individually imbed the several members 98 in the member 97 securely retaining them individually in adjusted position against accidental shifting movement. On the other hand, when the clamping pressure is released the inherent resilience of the member 97 will push the weights outward axially into a position where they may freely automatically adjust themselves to effect accurate balancing of the rotating spindle 12 and associated parts.

It will be noted that in the present construction there has been provided a multiple cantilever spring mounting for the front bearing in which the suspension is so arranged that the moment of inertia will be identical in all axial planes, thus permitting the freed end of the spindle to describe a truly circular orbit when the bearing is unclamped. At the same time, it will be noted that by arrangement of the pivot center for the restrained end of the spindle inside and central with the driving sheave the several elements are so disposed that no moments are imparted to the spindle in axial plane other than those set up by any existing condition of unbalance.

As mentioned above, the discs 21 and 22 are preferably of frusto-spherical form having their centers of curvature as at the point 102 or center of potential pivotance or gyration of the shaft 12 as determined by the members 18—19. This construction provides a thrust bearing satisfactorily holding the shaft against possible endwise movement and at the same time permitting of its free gyration when unclamped.

What is claimed is:

1. In a grinding machine, the combination with a spindle housing unit having a spindle receiving bore formed therein, of a spindle assembly including a bearing sleeve unit mounted within the bore, a spindle having a portion journaled within the sleeve, resilient arms carried by the sleeve and extending axially therefrom in circumscribing relation to the spindle, an auxiliary bearing unit carried by the arms and positionable within the bore, said auxiliary bearing unit being of less diameter than the bore and capable of limited movement relative thereto, said auxiliary unit interfitting with the spindle for effecting a journaling thereof, and means for clamping said auxiliary bearing unit in fixed position within the bore.

2. In a grinding machine, the combination with a spindle housing unit having a spindle receiving bore formed therein, of a spindle assembly including a bearing sleeve unit mounted within the bore, a spindle having a portion journaled within the sleeve, resilient arms carried by the sleeve and extending axially therefrom in circumscribing relation to the spindle, an auxiliary bearing unit carried by the arms and positionable within the bore, said auxiliary bearing unit being of less diameter than the bore and capable of limited movement relative thereto, said auxiliary unit interfitting with the spindle for effecting a journaling thereof, means for clamping said auxiliary bearing unit in fixed position within the bore, said sleeve being formed with an oil receiving chamber, the auxiliary bearing unit being formed with an oil receiving chamber, and conduit means interconnecting the chambers of the main sleeve and the auxiliary unit for flow of lubricating medium therebetween.

3. In a grinding machine, the combination with a spindle housing unit having a spindle receiving bore formed therein, of a spindle assembly including a bearing sleeve unit mounted within the bore, a spindle having a portion journaled within the sleeve, resilient arms carried by the sleeve and extending axially therefrom in circumscribing relation to the spindle, an auxiliary bearing unit carried by the arms and positionable within the bore, said auxiliary bearing unit being of less diameter than the bore and capable of limited movement relative thereto, said auxiliary unit interfitting with the spindle for effecting a journaling thereof, means for clamping said auxiliary bearing unit in fixed position within the bore, said sleeve being formed with an oil receiving chamber, the auxiliary bearing unit being formed with an oil receiving chamber, conduit means interconnecting the chambers of the main sleeve and the auxiliary unit for flow of lubricating medium therebetween, means for introducing lubricating medium under pressure into said intercommunicating chambers, and means for variably determining the pressure of said medium.

4. In a balancing mechanism of the character described, the combination with a rotatable member having a weight receiving chamber formed therein concentric with the axis thereof, of a plurality of balancing weights loosely mounted within said chamber, a power operable clamping device forming an abutment at one end of the chamber and adapted for joint engagement with the plurality of balancing members, and an opposed deformable resilient member forming an abutment at the opposite end of the chamber whereby actuation of the power device will effect locking imbedment of the balancing devices in said deformable abutment member.

5. The combination with a grinding machine having a housing portion formed with a spindle receiving bore, of a spindle mounting unit engageable within the bore, said unit including a first sleeve member of dimension for interfitting engagement with the bore, a second sleeve member of less diameter than the bore and adapted to be freely received within the bore, means resiliently interconnecting said sleeve members, bearing elements carried by said sleeves, a spindle loosely fitting within the first sleeve and journaled in said bearing elements, means pivotally supporting the bearing elements in the first sleeve to permit of oscillation of the spindle axis about said supporting means as a pivot, sleeve clamping means carried by the housing, and means for operatively shifting the clamping means to secure the second sleeve rigidly in position within the housing.

6. The combination with a grinding machine having a housing portion formed with a spindle receiving bore, of a spindle mounting unit engageable within the bore, said unit including a first sleeve member of dimension for interfitting engagement with the bore, a second sleeve member of less diameter than the bore and adapted to be freely received within the bore, means resiliently interconnecting said sleeve members, bearing elements carried by said sleeves, a spindle loosely fitting within the first sleeve and journaled in said bearing elements, means pivotally supporting the bearing elements in the first sleeve to permit of oscillation of the spindle axis about said supporting means as a pivot, sleeve clamping means for the second sleeve member carried by the housing, said clamping means including a shiftable stud, a reciprocable clamp bar having a cam portion interengaged with the stud for controlling its position, and means for reciprocating the clamp bar.

7. The combination with a grinding machine having a housing portion formed with a spindle receiving bore, of a spindle mounting unit engageable within the bore, said unit including a first sleeve member of dimension for interfitting engagement with the bore, a second sleeve member of less diameter than the bore and adapted to be freely received within the bore, means resiliently interconnecting said sleeve members, bearing elements carried by said sleeves, a spindle loosely fitting within the first sleeve and journaled in said bearing elements, means pivotally supporting the bearing elements in the first sleeve to permit of oscillation of the spindle axis about said supporting means as a pivot, sleeve clamping means for the second sleeve member carried by the housing, said clamping means including a shiftable stud, a reciprocable clamp bar having a cam portion interengaged with the stud for controlling its position, means for reciprocating the clamp bar, and a yieldable stop device for limiting initial movement of the bar.

8. The combination with a grinding machine having a housing portion formed with a spindle receiving bore, of a spindle mounting unit engageable within the bore, said unit including a first sleeve member of dimension for interfitting engagement with the bore, a second sleeve member of less diameter than the bore and adapted to be freely received within the bore, means resiliently interconnecting said sleeve members, bearing elements carried by said sleeves, a spindle loosely fitting within the first sleeve and journaled in said bearing elements, means pivotally supporting the bearing elements in the first sleeve to permit of oscillation of the spindle axis about said supporting means as a pivot, sleeve clamping means for the second sleeve member carried by the housing, said clamping means including a shiftable stud, a reciprocable clamp bar having a cam portion interengaged with the stud for controlling its position, means for reciprocating the clamp bar, releasable balancing devices carried by the spindle, and means operable on movement of the bar for effecting unclamping of said balancing devices.

9. The combination with a grinding machine having a housing portion formed with a spindle receiving bore, of a spindle mounting unit engageable within the bore, said unit including a first sleeve member of dimension for interfitting engagement with the bore, a second sleeve member of less diameter than the bore and adapted to be freely received within the bore, means resiliently interconnecting said sleeve members, bearing elements carried by said sleeves, a spindle loosely fitting within the first sleeve and journaled in said bearing elements, means pivotally supporting the bearing elements in the first sleeve to permit of oscillation of the spindle axis about said supporting means as a pivot, sleeve clamping means for the second sleeve member carried by the housing, said clamping means including a shiftable stud, a reciprocable clamp bar having a cam portion interengaged with the stud for controlling its position, means for reciprocating the clamp bar, releasable balancing devices carried by the spindle, and means operable on movement of the bar for effecting unclamping of said balancing devices, said means including a hydraulic pressure system and a normally inoperative high pressure valve for controlling the actuating pressure in the system.

10. The combination with a grinding machine having a housing portion formed with a spindle receiving bore, of a spindle mounting unit engageable within the bore, said unit including a first sleeve member of dimension for interfitting engagement with the bore, a second sleeve member of less diameter than the bore and adapted to be freely received within the bore, means resiliently interconnecting said sleeve members, bearing elements carried by said sleeves, a spindle loosely fitting within the first sleeve and journaled in said bearing elements, means pivotally supporting the bearing elements in the first sleeve to permit of oscillation of the spindle axis about said supporting means as a pivot, sleeve clamping means carried by the housing, means for operatively shifting the clamping means to secure the second sleeve rigidly in position within the housing, and a power transmitting means for effecting rotation of the spindle having an operative portion circumscribing said pivoting means in centralized relation relative thereto substantially as and for the purpose described.

11. A reversibly mountable dynamic spindle balancing structure for grinding machines or the like including a housing unit having a central bore, longitudinally spaced clamp studs carried by the housing and projectable into the bore, a spindle unit for reversible mounting in either of two positions within the bore, said unit comprising a first sleeve member of diameter for interfitting engagement with the bore, in underlying relation to one of the clamp studs, said sleeve having a recess to receive the stud, a second sleeve member of less diameter than the diameter of the bore and spaced axial from the first sleeve member to fit in the bore in underlying relation to the other of said studs, means resiliently interconnecting said sleeve members, a spindle jointly journaled in the respective sleeve members, a locking bar slidably mounted on the housing having oppositely disposed cam portions engageable with the clamping studs, means for effecting reciprocation of the bar to clamp and unclamp the resiliently supported sleeve in either of said positions thereof, and yielding stop devices for respectively limiting the movement of the bar in either direction of movement thereof.

12. A reversibly mountable dynamic spindle balancing structure for grinding machines or the like including a housing unit having a central bore, longitudinally spaced clamp studs carried by the housing and projectable into the bore, a spindle unit for reversible mounting in either of two positions within the bore, said unit comprising a first sleeve member of diameter for interfitting engagement with the bore, in underlying relation to one of the clamp studs, said sleeve having a recess to receive the stud, a second sleeve member of less diameter than the diameter of the bore and spaced axial from the first sleeve member to fit in the bore in underlying relation to the other of said studs, means resiliently interconnecting said sleeve members, a spindle jointly journaled in the respective sleeve members, a locking bar slidably mounted on the housing having oppositely disposed cam portions engageable with the clamping studs, means for effecting reciprocation of the bar to clamp and unclamp the resiliently supported sleeve in either of said positions thereof, yielding stop devices for respectively limiting the movement of the bar in either direction of movement thereof, a balancing mechanism carried by the spindle including a clamp element, a hydraulic power circuit for determining the effectiveness of the clamp element, and means controlled by the bar when moved for determining the reaction of the hydraulic power circuit as respects the clamp element.

13. In a structure of the character described including a support, a spindle journaled within the support for rotation relative thereto, a resiliently mounted journal for one end of the spindle, means for rigidly clamping the journal in position with respect to the support, an automatic balancing mechanism carried by the spindle including hydraulically releasable balancing elements, a control device movable into a first position for effecting an unclamping of the spindle journal and into a second position for effecting hydraulic unclamping of the balancing devices, and a single operating means for effecting the successive movements of the control device.

14. In a structure of the character described including a support, a spindle journaled within the support for rotation relative thereto, a resiliently mounted journal for one end of the spindle, means for rigidly clamping the journal in position with respect to the support, an automatic balancing mechanism carried by the spindle including hydraulically releasable balancing elements, a control device movable into a first position for effecting an unclamping of the spindle journal and into a second position for effecting hydraulic unclamping of the balancing devices, means for effecting the successive movements of the control device, and additional means for effecting a limited reversal of movement of the control device whereby automatic locking of the balancing elements will be effected without reclamping of the journal.

15. Means for mounting a grinding machine spindle or the like for dynamic balancing thereof including a first bearing unit supporting the spindle for rotary and pivotal movements, a second releasable bearing for the spindle spaced from the first bearing, and a multiple cantilever spring suspension mounting for the releasable bearing having its moment of inertia identical in all axial planes whereby on unclamping of the bearing the spindle will be freed to describe a truly circular orbit.

16. In a structure of the character described including a support, a first bearing element rigidly mounted on the support, a spindle loosely fitting within said element, pivotally supported bearings carried by the element in circumscribing relation to the spindle to support same for rotary and pivotal movements, a second bearing element including bearings interengaged with the spindle to rotatably support same and a multiple cantilever spring mounting structure intervening and connecting the two bearing elements whereby the second bearing element is supported by the first for lateral movement relative thereto while restrained against relative rotational movement.

17. In a structure of the character described including a spindle, a support therefor, a first radial bearing means intervening the spindle and support and mounting the spindle for rotation, pivot members providing a center of axial oscillation of the bearing means and spindle with respect to the support, a second releasable bearing intervening the spindle and support, and additional thrust bearing elements intervening the spindle and support having interengaging spherical surfaces concentric with the center of oscillation of the spindle whereby when the second bearing is unclamped said thrust bearings will maintain the spindle against axial movement while permitting oscillation thereof.

ALBERT H. DALL.
WALTER SCHROEDER.

REFERENCES CITED

The following references are of record in the file of this patent:

UNITED STATES PATENTS

| Number | Name | Date |
|---|---|---|
| 1,967,163 | Thearle | July 17, 1934 |
| 2,142,021 | Ernst et al. | Dec. 27, 1938 |
| 2,164,900 | Campbell | July 4, 1939 |